United States Patent [19]

Park et al.

[11] Patent Number: 5,726,746
[45] Date of Patent: Mar. 10, 1998

[54] AUTOMATIC INSPECTION SYSTEM FOR CAMERA LENSES AND METHOD THEREOF USING A LINE CHARGE COUPLED DEVICE

[75] Inventors: Heui-Jae Park; Seok-Won Lee, both of Seoul; Geon-Mo Kang; Ho-Gyun Moon, both of Kyeongsangnam-do, all of Rep. of Korea

[73] Assignee: Samsung Aerospace Industries, Ltd., Kyeongsangnam-do, Rep. of Korea

[21] Appl. No.: 749,973

[22] Filed: Nov. 15, 1996

[30] Foreign Application Priority Data

Apr. 12, 1996 [KR] Rep. of Korea ............... 96-10953

[51] Int. Cl.⁶ ............................................. G01M 11/00
[52] U.S. Cl. ............................................. 356/124.5
[58] Field of Search ...................... 356/124.5, 124, 356/125, 126, 127

[56] References Cited

U.S. PATENT DOCUMENTS

| | | | |
|---|---|---|---|
| 3,447,874 | 6/1969 | Baek | 356/124.5 |
| 3,938,892 | 2/1976 | Klingman, III | 356/124.5 |
| 4,653,909 | 3/1987 | Kuperman | 356/124.5 |
| 5,303,023 | 4/1994 | Portney et al. | 356/124.5 |

*Primary Examiner*—Hoa Q. Pham
*Attorney, Agent, or Firm*—Finnegan, Henderson, Farabow, Garrett & Dunner, L.L.P.

[57] ABSTRACT

An automatic inspection system for camera lenses and method thereof using a line charge coupled device (CCD) which can process a signal easily and perceive a focal distance of lenses exactly by focusing automatically using a modulation transfer function (MTF) method when designing lenses. The automatic inspection system for camera lenses using a line CCD comprises a light source, a chart, a collimator, camera lenses, a mirror, an image pickup part, a signal converter, and a control part.

17 Claims, 9 Drawing Sheets

AUTOMATIC INSPECTION SYSTEM FOR CAMERA LENSES AND METHOD THEREOF USING A LINE CHARGE COUPLED DEVICE

BACKGROUND OF THE INVENTION

A. Field of the Invention

The present invention relates to an automatic inspection system for camera lenses and method thereof using a line charge coupled device (CCD). More particularly, the present invention relates to an automatic inspection system for camera lenses and method thereof using a line CCD which can focus automatically using a modulation transfer function (MTF) method when designing lenses.

B. Description of the Prior Art

Recently, an important matter in an industrial world based on an optical science is whether a focus is automatically made. Actually, a user makes a focus manually using an autocollimator. However, a field necessary for automatic focusing in the industrial world grows rapidly, and automatization is required for mass-production. Particulary, in the case of camera lenses, automatic focusing for a camera becomes the most fundamental and delicate work when assembling the camera due to urgent and great demand. To focus is to designate absolute coordinates of lenses, and the lenses move on the basis of this point.

Generally, the lenses move on the basis of the point where a maximum value is outputted after comparing intensity values using a CCD. However, the conventional camera has disadvantages in that it takes lots of time because calculation for all the pixels should be carried out and a position of focus changes sensitively according to a change of a light source.

SUMMARY OF THE INVENTION

Accordingly, the object of the present invention is to provide an automatic inspection system for camera lenses and method thereof using a line charge coupled device (CCD) which can process a signal easily and perceive a focal distance of lenses exactly by focusing automatically using a modulation transfer function (MTF) method when designing lenses to substantially obviate one or more of the problems due to limitations and disadvantages of the prior art.

To achieve the object and in accordance with the purpose of the invention, the automatic inspection system for camera lenses, comprises:

a light source for projecting a predetermined amount of light;

a chart for changing the intensity of the light projected from the light source and outputting the light;

a collimator for converting the light passing through the chart into a beam of light and outputting the light;

camera lenses for forming an image from the beam of light outputted from the collimator;

a mirror for reflecting the light from which an image is formed by the camera lenses;

image pickup means including a plurality of pixels for picking up the image from the light reflected by the mirror and outputting an electrical signal corresponding to the pickup image;

a signal converter for converting the electrical signal outputted from the image pickup means into a corresponding digital signal;

control means for calculating an average value of the high and low points of the signals according to the change of the intensity of the light in response to the signal outputted from each pixel in the image pickup part, calculating a set value according to the average value of the high and low points of the intensity signals of the light, and determining whether the focus of the lenses is exactly made according to the calculated set value.

According to another aspect of the present invention, a method for automatically inspecting the camera lenses, comprising the steps of:

picking up the image to the image pickup means from the light reflected on a mirror through the camera lenses to be tested;

measuring the signals outputted from each pixel in the image pickup means several times, calculating an average value of the outputted signals, and calculating a first, a second and a third variables according to the calculated average value as follows;

$$\text{First variable } (X_{i-1}) = \sum_{j=i-1-M}^{i-1+M} P_j$$

$$\text{Second variable } (X_i) = \sum_{j=i-M}^{i+M} P_j$$

$$\text{Third variable } X_{i+1} = \sum_{j=i+1-M}^{i+1+M} P_j$$

where:

$P_j$ represents a signal value indicating the intensity of light outputted from j pixel;

M represents a constant indicating a high point of each intensity signal;

calculating a high point of a light intensity signal according to the first, the second and the third variables which satisfy the following condition;

If $(X_{i-1} < X_i, X_i > X_{i+1})$, then $\text{High}(k) = Xi$ calculating a low point of the light intensity signal according to the first, the second and the third variables which satisfy the following condition;

If $(X_{i-1} > X_i, X_i < X_{i+1})$, then $\text{Low}(k) = Xi$ averaging the position of the high point and the low point according to following conditions after calculating the high point and the low point of the signal according to the above conditions;

$$\max = \sum_{k=1}^{N1} \text{High}(k)/N1$$

$$\min = \sum_{k=1}^{N2} \text{Low}(k)/N2$$

where:

$N_1$ represents a number of the signal high point; and $N_2$ represents a number of the signal low point calculating a set value for determining whether the focus is exactly made according to the calculated average value of the high point and the low point of the signal as follows; and $$MTF = \frac{\max - \min}{\max + \min}$$

where:

max represents an average position value of the high point of the light intensity signal; and min represents an average position value of the low point of the light intensity signal determining whether the focus of the lenses is exactly made according to the calculated set value.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, illustrate an embodiment of the invention and, together with the description, serve to explain the principle of the invention.

DESCRIPTION OF THE PREFERRED EMBODIMENT

Reference will now be made in detail to a preferred embodiment of the present invention, examples of which are illustrated in the accompanying drawings.

Figure 1:
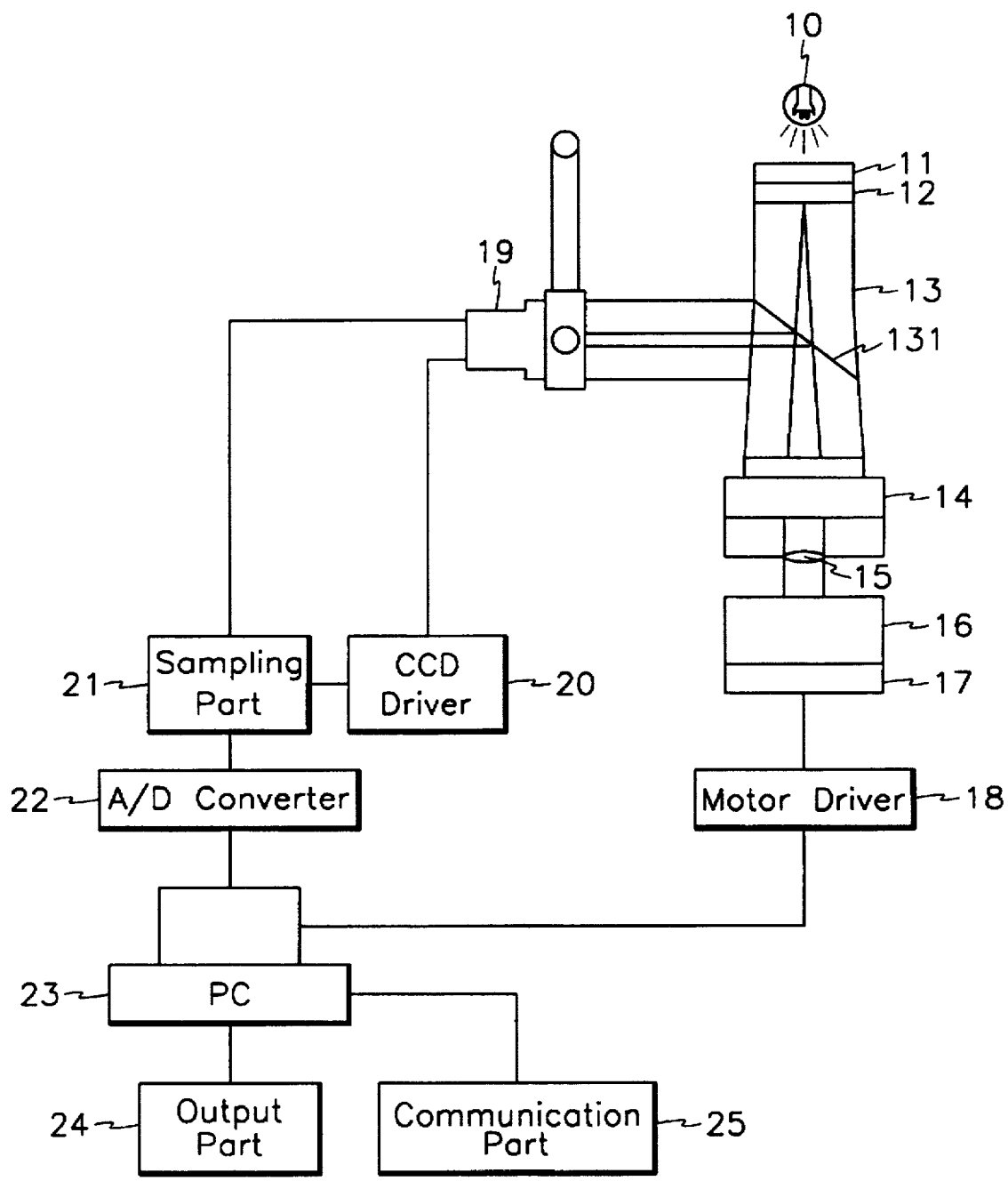
FIG. 1 is a block diagram illustrating an automatic inspection system for camera lenses using a line CCD in accordance with a preferred embodiment of the present invention.
Figure 2:
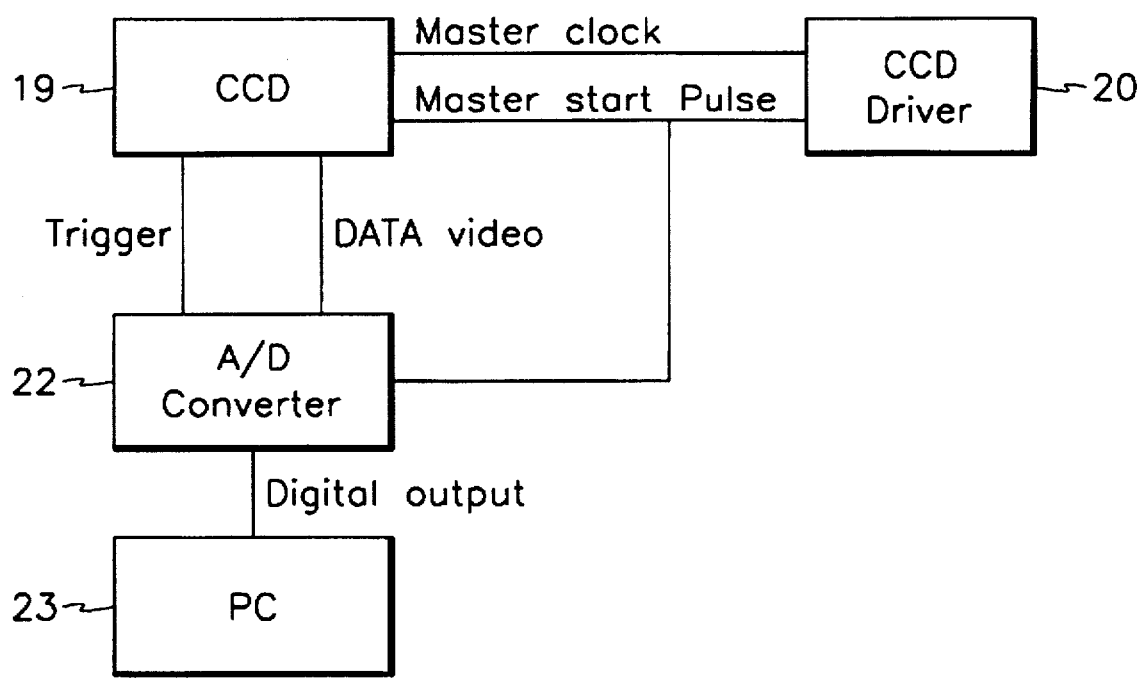
FIG. 2 is a block diagram illustrating an electrical signal transmission relation of an automatic inspection system for camera lenses using a line CCD in accordance with a preferred embodiment of the present invention.

Referring to FIG. 1, the automatic inspection system for camera lenses using a line charge coupled device includes:

a light source 10;

a filter 11 mounted to an output terminal of the light source 10;

a chart 12 mounted to an output terminal of the filter 11;

a collimator 13 mounted to an output terminal of the chart 12;

a camera lens 14 mounted to an output terminal of the collimator 13;

a stage 16 for transferring the camera lens for inspection;

a mirror 15 mounted on the stage 16;

a charge coupled device (CCD) 19 for picking up the image of light outputted from the collimator 13;

a sampling part 21 mounted to an output terminal of the CCD 19;

an analog/digital (A/D) converter 22 mounted to an output terminal of the sampling part 21;

a personal computer (PC) 23 mounted to an output terminal of the A/D converter 22; and a CCD driver 20.

The mirror 15 is mounted on the stage 16, and the stage 16 moves up and down in a direction of optical axis of a camera by a step motor 17. In addition, the automatic inspection system for camera lenses using a line charge coupled device further includes a motor driver 18 for driving the step motor 17 according to a control signal outputted from the PC 23.

In addition, the automatic inspection system for camera lenses using a line charge coupled device further includes an output part 24 including a printer or plotter for outputting data processed by the PC 23, and a communication part 25 for transmitting data processed in the PC 23 to the other PC.

Figure 5:
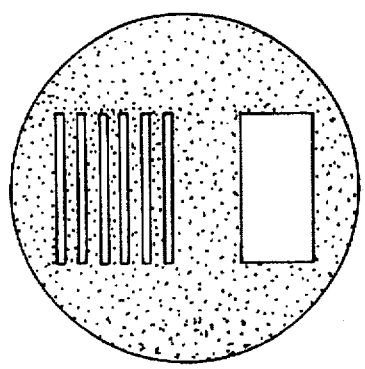
FIG. 5 is a diagram illustrating state of a chart in accordance with a preferred embodiment of the present invention.
Figure 6A:
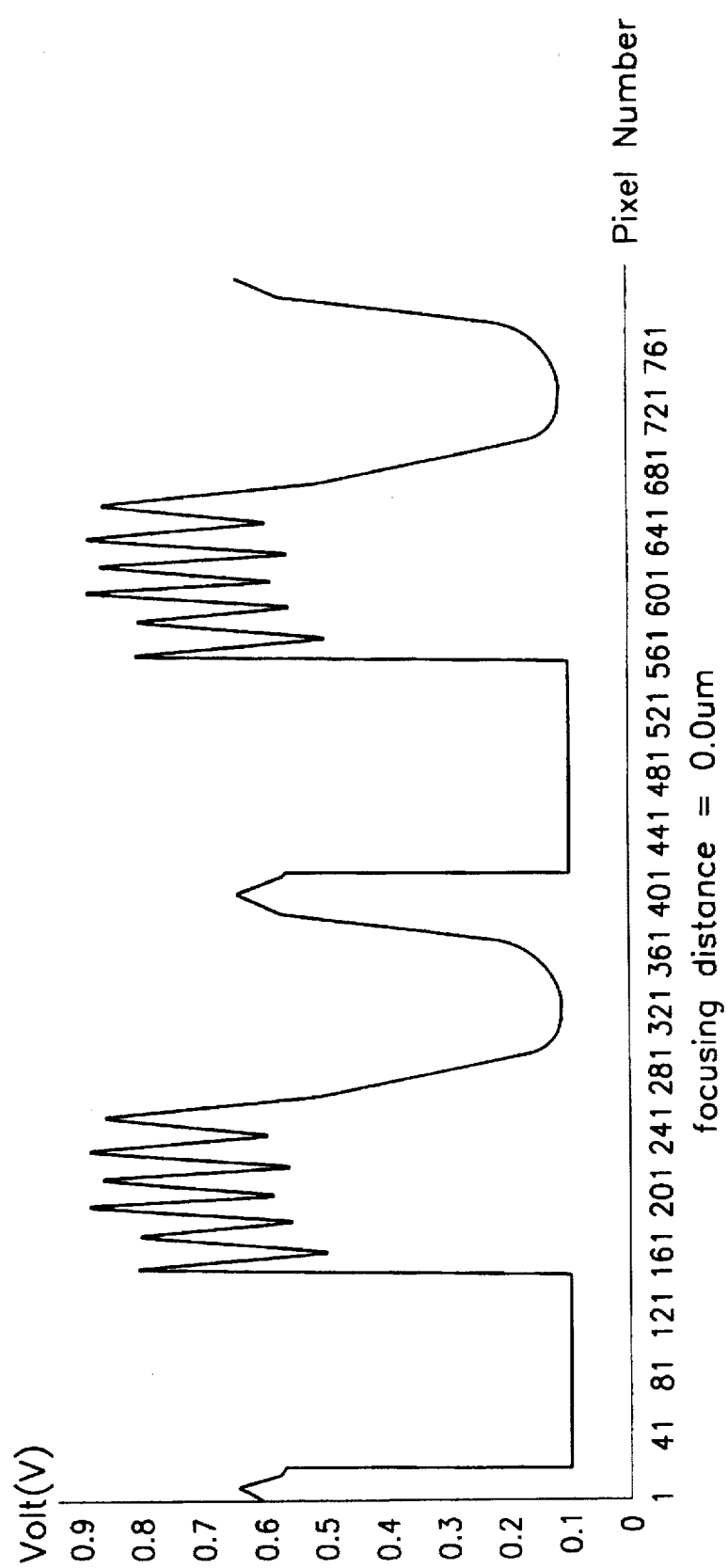
FIGS. 6A to 6D are waveform charts of a signal outputted from a CCD in accordance with a preferred embodiment of the present invention.
Figure 6B:
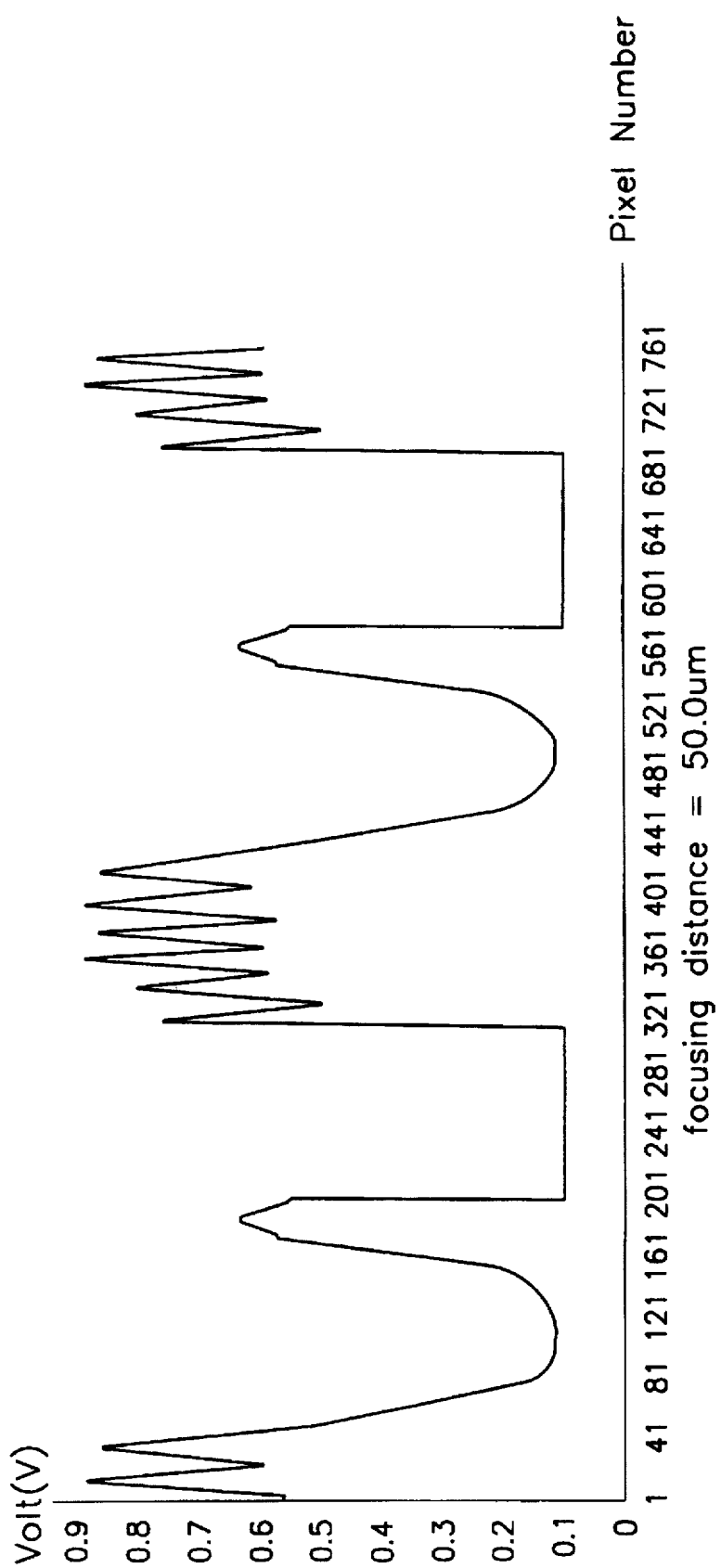
Figure 6C:
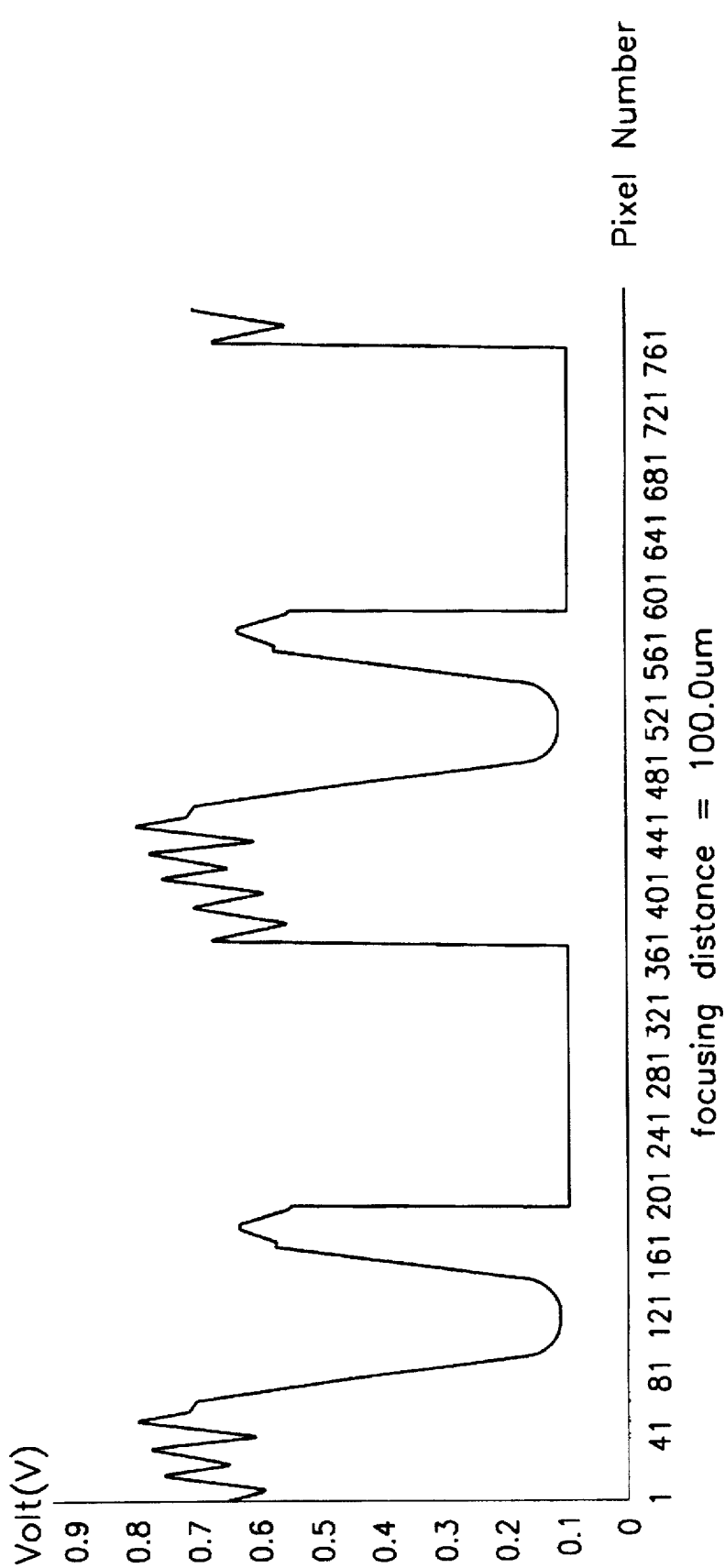
Figure 6D:
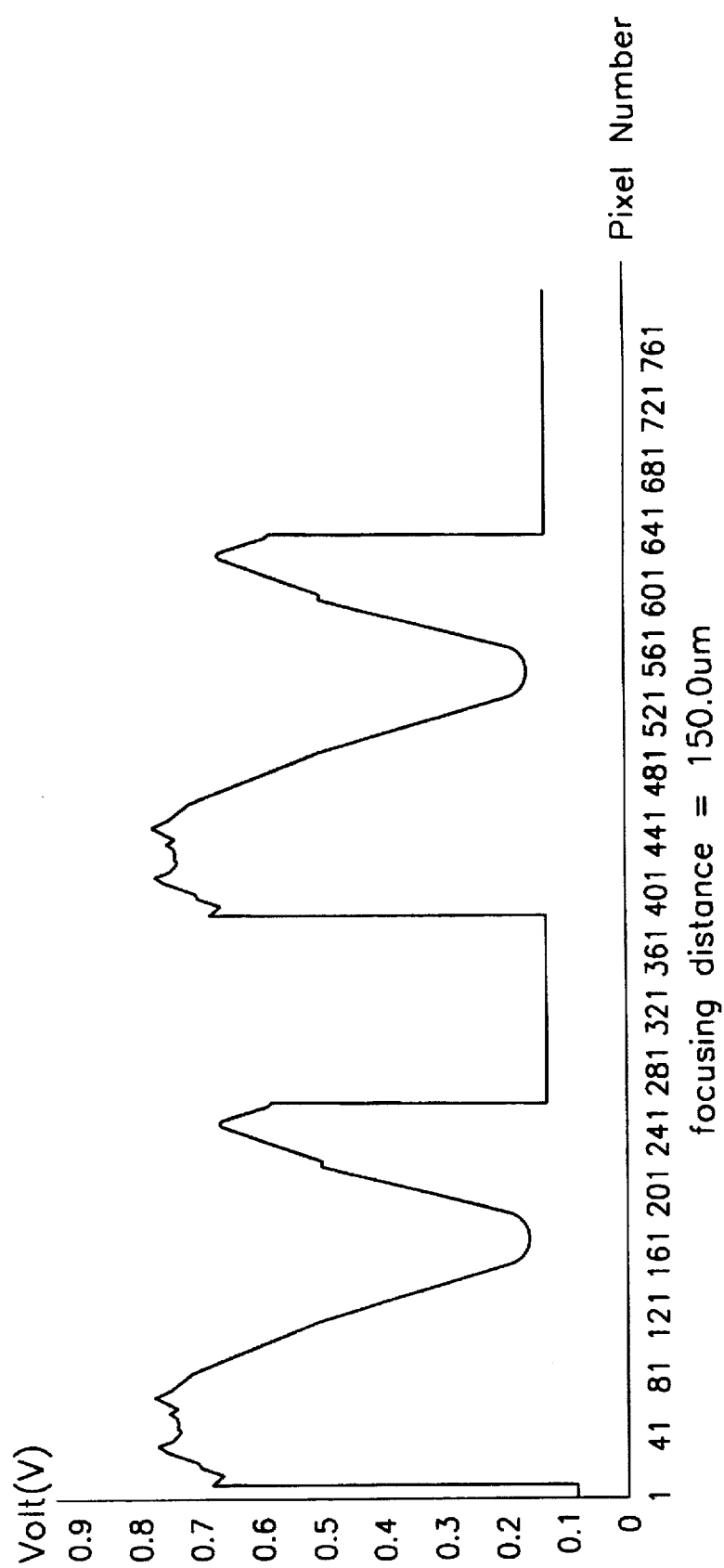

The chart 12 is a kind of film, and referring to FIG. 5, includes a black portion which light can not pass through and a plurality of white rectangular portions which the light passes through and formed at regular intervals.

The collimator 13 includes a half mirror 131 which the light outputted from the light source 10 passes through and reflects the light, which is reflected by the mirror 15 and is incident, to the CCD 19. The half mirror 131 is mounted to a central part in the collimator 13.

The operation of the automatic inspection system for camera lenses using a line CCD in accordance with a preferred embodiment of the present invention is explained as follows.

In the preferred embodiment of the present invention, the image is picked up from the light which is outputted from the light source 10, passes through the camera lens and is reflected by the mirror 15. An electrical signal outputted in response to the picked-up image is processed according to set algorithms, and a modulation transfer function (MTF) value is calculated. The focus position of a lens is perceived when a maximum MTF value is calculated while the position of the mirror changes according to the calculated MTF value.

First, a camera including test lenses is mounted to the output terminal of the collimator 13 as illustrated in FIG. 1 and the mirror 15 is mounted under the camera lenses 14.

Next, the CCD 19 is mounted to the place where a user has observed an object through an eyepiece generally, and power is applied. As power is applied, the light source 10 is driven and a predetermined amount of light is outputted. The light outputted from the light source 10 is filtered and outputted to the chart 12.

Figure 3:
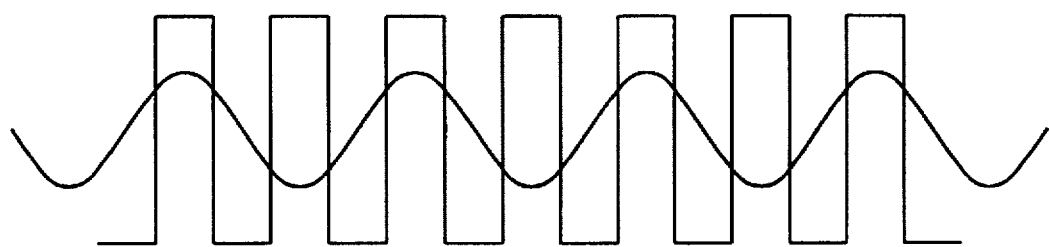
FIG. 3 is a waveform chart of light passing through a chart in accordance with a preferred embodiment of the present invention.
Figure 4:
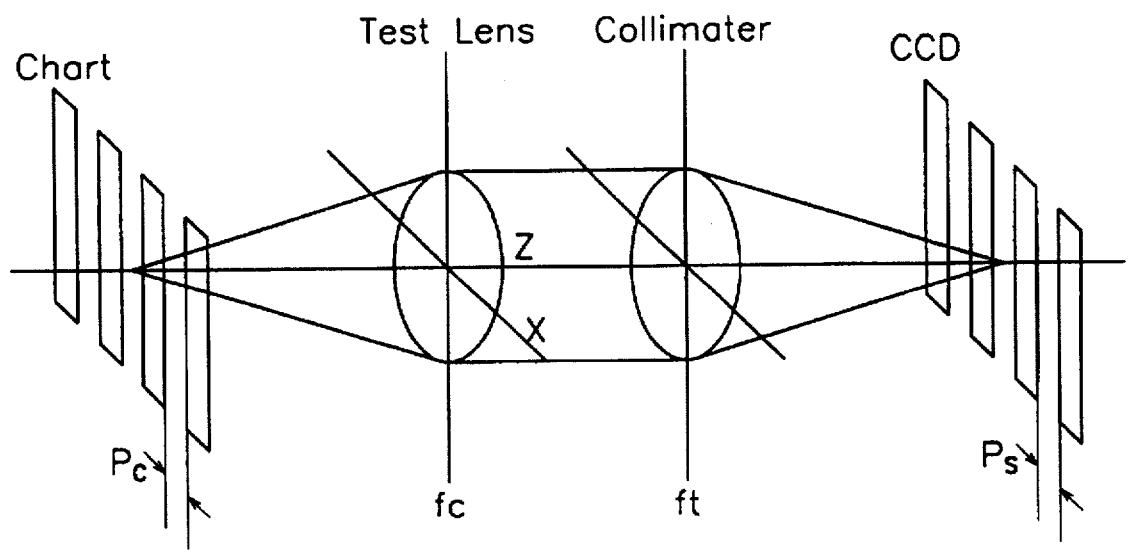
FIG. 4 is a diagram illustrating a light transmission state between a chart and a CCD in accordance with a preferred embodiment of the present invention.

Only the light having about 549 μm wavelength passes through the filter 11 form the light outputted from the light source 10, and the light filtered by the filter 11 is outputted to the chart 12, as a material to test performance of the lenses, in which a dark portion and a bright portion are formed at regular intervals as illustrated in FIG. 3.

After passing through the chart 12, the light is converted into a beam of light as the light passes through the collimator 13, and becomes incident to the camera lenses mounted to the output terminal of the collimator 13. After passing through the camera lenses 14, the light is reflected by the mirror 15 and again becomes incident to the collimator 13.

The light, being incident to the collimator 13, is reflected by the half mirror 15 and outputted to the CCD 19 mounted on the eyepiece. The half mirror 131 makes the light outputted from the light source 10 pass through and reflects the light, which is incident from the camera lenses 14, to the CCD 19.

The CCD driver 20 outputs a master start signal for driving the CCD 19 in response to the control signal outputted from the PC 23 at the same time as the light source 10 is driven. Each pixel of the CCD 19 is synchronized according to the applied master start signal, and outputs a voltage signal according to intensity of light applied together with a trigger signal.

At this time, one pixel in the CCD 19 is driven once per clock signal outputted from the CCD driver 20, and the CCD 19 outputs the voltage signal corresponding to the intensity of light which is incident together with the trigger signal.

Noise is removed from the signal outputted from the CCD 19 by the sampling part 21, and the processed signal is inputted to the A/D converter 22. The A/D converter 22 operates in a mode converted by the trigger signal and transmits the signal to the PC 23 using a Direct Memory Access (DMA) which is a faster transmission method.

The voltage signal outputted from the CCD 19 is inputted into the A/D converter 22, is converted to a digital signal of 16 bits corresponding to the voltage signal, and is inputted into the PC 23.

The PC 23 processes the signal outputted from the CCD 19 according to the set algorithms, and determines whether the camera lenses 14 is positioned exactly at a focal length.

As the light projected from the light source 10 passes through the chart 12, a light intensity signal is produced as illustrated in FIG. 3. When the light is positioned at the focus position of the lenses, the dark and bright portions in the chart 12 are clearly shown. However, when the focus is not made, the dark and bright portions in the chart 12 are not clearly shown.

The interval of the chart 12 is defined according to a following condition, considering a lattice interval of the light which passes through the lenses.

$$P_s = (f_c/f_f) \times P_c \quad (1)$$

where:

$f_c$ represents the focal length of the camera lenses;

$f_f$ represents the focal length of a collimator lens;

$P_c$ represents an line interval of the chart; and $P_s$ represents an line interval in a projected image formed in the CCD.

As described above, the MTF is a value which represents a deviation according to the difference of clearness of the dark and bright portions of the chart 12 in a numerical formula. In the preferred embodiment of the present invention, a user can determine whether the lenses are exactly positioned at the focus position according to the MTF value.

First, the PC 23 obtains an average value of a voltage value by measuring the voltage value outputted from each pixel several times to remove the noise of the signal outputted from the CCD 19 (Step 140).

Next, the following values are obtained, using the calculated average value.

$$X_{i-1} = \sum_{j=i-1-M}^{i-1+M} P_j \quad (2)$$

$$X_i = \sum_{j=i-M}^{i+M} P_j \quad (3)$$

$$X_{i+1} = \sum_{j=i+1-M}^{i+1+M} P_j \quad (4)$$

where:

$P_j$ represents a signal value indicating the intensity of light outputted from j pixel;

$X_{i-1}$ represents a first variable;

$X_i$ represents a second variable;

$X_{i+1}$ represents a third variable; and

M represents a constant indicating a high point of each intensity signal.

In the above, after calculating the values of $X_i$, $X_{i-1}$ and $X_{i+1}$, the high point of a signal, which satisfies the following condition, is calculated.

$$\text{If } (X_i-1 < X_i, X_i > X_i+1), \text{ then High}(k) = Xi \quad (5)$$

After calculating the high point of the signal, a low point of a signal, which satisfies the following condition, is calculated.

$$\text{If } (X_i-1 > X_i, X_i < X_i+1), \text{ then Low}(k) = Xi \quad (6)$$

After calculating the high point and the low point of the signal according to the conditions, the position of the high point and the low point is averaged.

$$\max = \sum_{k=1}^{N1} \text{High}(k)/N1 \quad (7)$$

$$\min = \sum_{k=1}^{N2} \text{Low}(k)/N2 \quad (8)$$

where:

$N_1$ represents a number of the high point of the signal; and $N_2$ represents a number of the low point of the signal.

After averaging the position of the high point and the low point, the MTF value is calculated according to following condition (Step 150).

$$MTF = \frac{\max - \min}{\max + \min} \quad (9)$$

The MTF value can be calculated by reducing the influence of the noise in a maximum through the above-mentioned step, the physical meaning of the MTF is that the larger the value of MTF is, the clearer the screen of the CCD 19 is, and the smaller the value of MTF is, the unclearer the screen of the CCD 19 is.

Accordingly, an interrelation with the focus can be obtained according to the value of MTF. That is, the nearer to the focus the position of the lenses is, the larger the value of MTF is, and the further from the focus the position is, the smaller the value of MTF is.

In the preferred embodiment of the present invention, the maximum MTF value is calculated, moving the mirror 15 according to the interrelation of the MTF and the focus.

Figure 7:
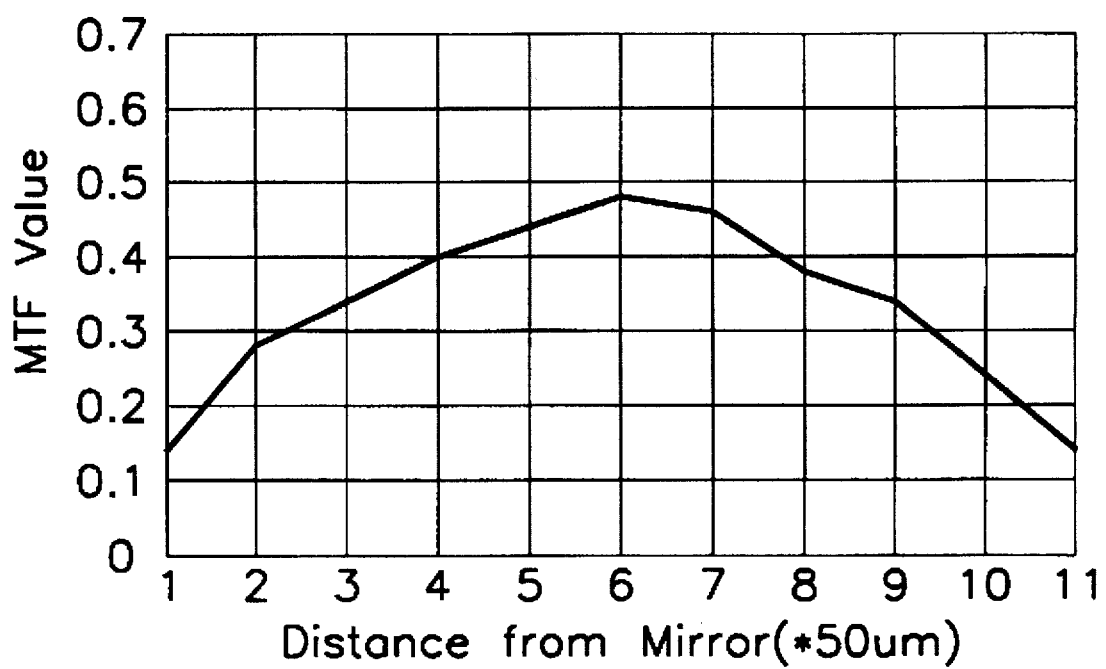
FIG. 7 is a signal graph illustrating MTF value as a function of mirror position in accordance with a preferred embodiment of the present invention.
Figure 8:
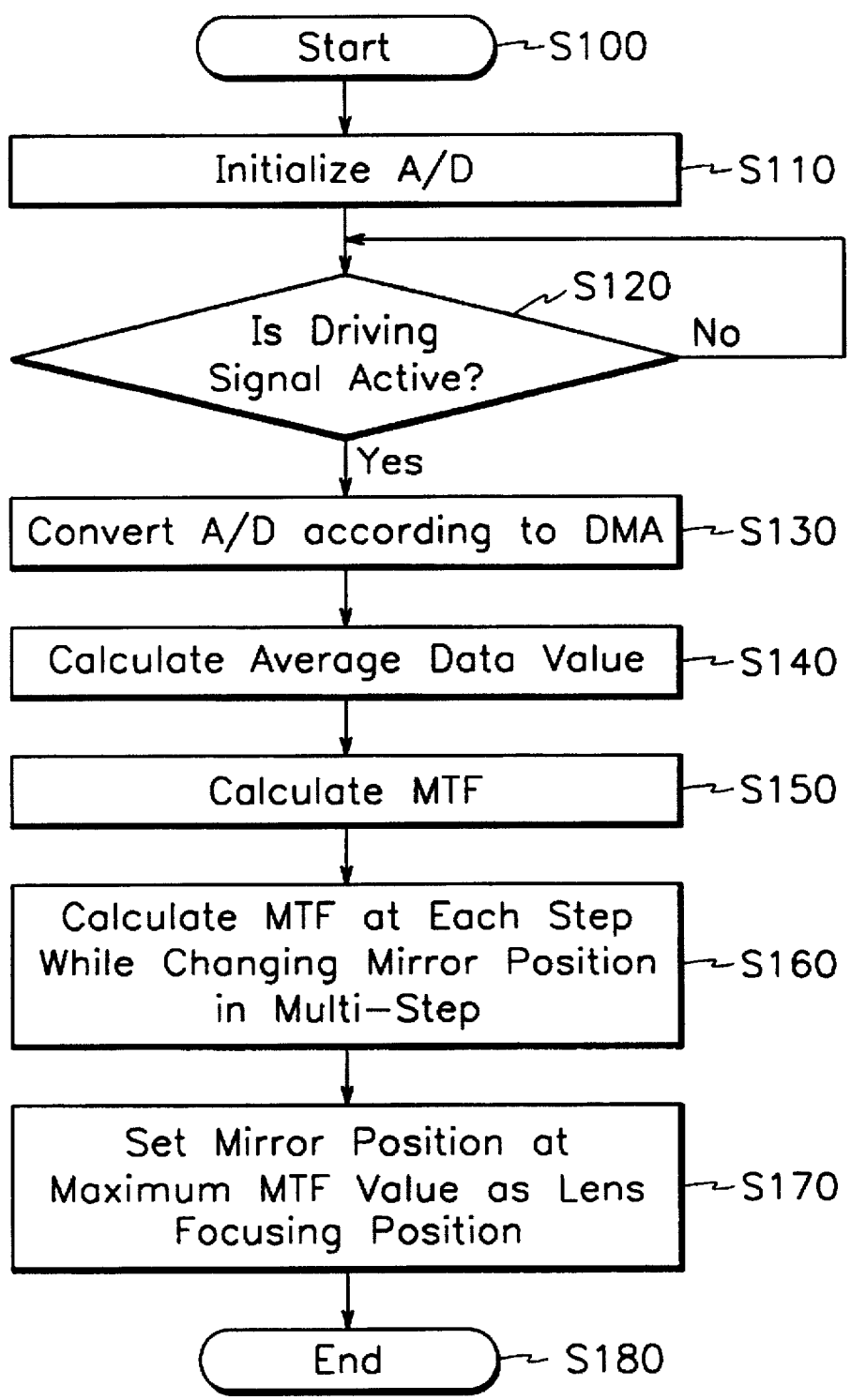
FIG. 8 is a flowchart illustrating the operational steps of method for automatically inspecting camera lenses using a line CCD.

The data of the experiment is outputted after being processed as illustrated in FIG. 6, and the processed data is outputted as illustrated in FIG. 7.

FIG. 6 illustrates the intensities of light which passes through the chart 12. The height of the signal is not uniform because the noise and the light source are not spread uniformly. The other light in a rear part is the light produced from a part which does not have the lattice as illustrated in the chart 12, and the intensity of the light is weak because the light from the light source is not uniform. However, there is not that much of a bad influence because this part is not used in calculating the MTF value.

The intensity of the light is not uniform in a part which the light intensity is strong and a part which the light intensity is weak, and there is lots of noise when calculating values corresponding to conditions 1 to 3 using the value obtained from each pixel actually. Accordingly, a plurality of data is measured and the average thereof is used. The number of pixel is restricted to 150.

As a result, a very satisfactory value is obtained. On the basis of this value, the MTF value is obtained and the values are compared while changing the position of the mirror.

The change of MTF value according to the change of the mirror position is shown in a parabola in FIG. 7, and the peak of the parabola is the maximum value of the MTF value supposing that this parabola is a curve of a secondary degree.

Accordingly, after obtaining the value of MTF from an initial mirror position, the MTF values can be compared at each lens position while changing the mirror position at regular intervals, whereby the user may perceive the focus position of the lenses according to the changed values.

The PC 23 outputs a driving signal to the motor driver 18, changes the position of the stage 16, on which the mirror 15 is mounted, and calculates the MTF value again at the changed position.

After calculating the MTF value at each step while changing the mirror position in multi-step, the PC 23 determines the mirror position when the maximum MTF value is calculated among the calculated MTF values as a state that the focus of the test lenses is exactly made (Steps 160 to 170).

Accordingly, the signal outputted from the CCD 19 as the mirror position changes, is shown in FIG. 7, and the wider the difference between the top value and the bottom value, the nearer to the focus.

In addition, the MTF value becomes smaller as the front and rear distances centering on the focus becomes further, and the maximum MTF value may be obtained at the point where the focus is made.

After calculating the focus position, the PC 23 determines the position of the camera lenses 14, considering the position of the mirror 15, and controls the focus of the lenses automatically using the motor.

The PC 23 may output a plurality of calculated data through the output part 24 or transmit to another PC through the communication part 25.

As described above, the preferred embodiment of the present invention provide the automatic inspection system for camera lenses and method thereof using a line CCD which can process the signal easily and perceive the focal distance of lenses exactly by focusing automatically using the MTF method when designing lenses.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. An automatic inspection system for camera lenses using a line charge coupled device (CCD), comprising:

a light source for projecting a predetermined amount of light;

a chart for changing the intensity of the light projected from the light source and outputting the light;

a collimator for converting the light passing through the chart into a beam of light and outputting the light;

camera lenses for forming an image from the parallel light outputted from the collimator;

a mirror for reflecting the light from which an image is formed by the camera lenses;

image pickup means including a plurality of pixels for picking up the image from the light reflected by the mirror and outputting an electrical signal corresponding to the pickup image;

a signal converter for converting the electrical signal outputted from the image pickup means into a corresponding digital signal;

control means for calculating an average value of high points and low points of the signals according to the change of intensity of the light in response to the signal outputted from each pixel in the image pickup means, calculating a set value according to the average value of the high points and the low points of the intensity signals of the light, and determining whether the focus of the lenses is exactly made according to the calculated set value.

2. The automatic inspection system for camera lenses using a line CCD of claim 1, wherein the chart is formed by a plurality of films in which a part that the light passes through and a part that the light does not pass through, are formed at regular intervals.

3. The automatic inspection system for camera lenses using a line CCD of claim 2, wherein the interval of the part that the light passes through and the part that the light does not pass through, is defined by a following condition;

$$P_s = (f_c/f_f) \times P_c$$

where:

$f_c$ represents the focal length of the camera lenses;

$f_f$ repreeents the focal length of a collimator lens;

$P_c$ represents an line interval of the chart; and $P_s$ represents an line interval in a projected image formed in a CCD.

4. The automatic inspection system for camera lenses using a line CCD of claim 1, wherein the control means measures the signals outputted from each pixel in the image pickup means several times, calculates an average value of the outputted signals, and calculates a first, a second and a third variables according to the calculated average value as follows;

$$\text{First variable } (X_{i-1}) = \sum_{j=i-1-M}^{i-1+M} P_j$$

$$\text{Second variable } (X_i) = \sum_{j=i-M}^{i+M} P_j$$

$$\text{Third variable } X_{i+1} = \sum_{j=i+1-M}^{i+1+M} P_j$$

where:

$P_j$ represents a signal value indicating the intensity of light outputted from j pixel;

M represents a constant indicating a high point of each intensity signal;

the control means calculates a high point of a light intensity signal according to the first, the second and the third variables which satisfy the following condition;

If $(X_{i-1} < X_i, X_i > X_{i+1})$, then $\text{High}(k) = Xi$ the control means calculates a low point of the light intensity signal according to the first, the second and the third variables which satisfy the following condition;

If $(X_{i-1} > X_i, X_i < X_{i+1})$, then $\text{Low}(k) = Xi$ the control means averages the position of the high point and the low point according to following conditions after calculating the high point and the low point of the signal according to the above conditions;

$$\max = \sum_{k=1}^{N1} High(k)/N1$$

$$\min = \sum_{k=1}^{N2} Low(k)/N2$$

where:

$N_1$ represents a number of the high point of the signal; and $N_2$ represents a number of the low point of the signal and the control means calculates a set value for determining whether the focus is exactly made according to the calculated average value of the high point and the low point of the signal as follows;

$$MTF = \frac{\max - \min}{\max + \min}$$

where:

max represents a position average value of the high point of the light intensity signal; and min represents a position average value of the low point of the light intensity signal.

5. The automatic inspection system for camera lenses using a line CCD of claim 1, further comprising:

a stage on which the mirror is mounted;

a motor for changing the position of the stage; and a motor driver for driving the motor.

6. The automatic inspection system for camera lenses using a line CCD of claim 5, wherein the control means changes the position of the mirror in multi-step by driving the motor driver, measures the set values according to a change of the light intensity at each mirror position several times, and determines that the mirror position obtained when a maximum value is measured as a state where the focus of the camera lenses is exactly made.

7. The automatic inspection system for camera lenses using a line CCD of claim 1, wherein the control means changes the position of the mirror in multi-step by driving a motor driver, measures the set values according to a change of the light intensity at each mirror position several times, and determines that the mirror position obtained when a maximum value is measured as a state where the focus of the camera lenses is exactly made.

8. The automatic inspection system for camera lenses using a line CCD of claim 1, wherein the collimator includes a half mirror which passes the light outputted from the light source, and reflects the light being incident from the lenses to the image pickup means.

9. The automatic inspection system for camera lenses using a line CCD of claim 1, further comprising a filter for filtering the light with only a predetermined wavelength from the light projected from the light source and for outputting the filtered light.

10. The automatic inspection system for camera lenses using a line CCD of claim 1, wherein the image pickup means includes:

an image pickup device having a plurality of pixels, and for picking up the image from an applied light signal and outputting an electrical signal corresponding to the pickup image; and an image pickup means driver for driving the image pickup device according to a signal outputted from the control means.

11. The automatic inspection system for camera lenses using a line CCD of claim 10, wherein the image pickup device is a charge coupled device formed by 150 pixels.

12. The automatic inspection system for camera lenses using a line CCD of claim 1, further comprising a sampling means for sampling the electrical signal outputted from the image pickup means and outputting the sampled signal to the signal converter.

13. The automatic inspection system for camera lenses using a line CCD of claim 1, further comprising:

output means for outputting a result data outputted from the control means; and communication means for transmitting the data outputted from the control means.

14. An automatic inspection system for camera lenses using a line charge coupled device (CCD), comprising:

a light source for projecting a predetermined amount of light;

a filter for filtering the light having only a predetermined wavelength from the light projected from the light source and for outputting the filtered light;

a chart for changing the intensity of the light projected from the filter and outputting the light;

a collimator for converting the light passing through the chart into a beam of light and outputting the light;

camera lenses for forming an image from the a beam of light outputted from the collimator;

a mirror for reflecting the light from which image is formed by the camera lenses;

image pickup means including a plurality of pixels for picking up the image from the light reflected by the mirror and outputting an electrical signal corresponding to the pickup image;

a signal converter for converting the electrical signal outputted from the image pickup means into a corresponding digital signal;

control means for calculating an average value of high points and low points of the signals according to the change of intensity of the light in response to the signal outputted from each pixel in the image pickup means, calculating a set value according to the average value of the high points and the low points of the intensity signals of the light, and determining whether the focus of the lenses is exactly made according to the calculated set value.

15. A method for automatically inspecting the camera lenses, comprising the steps of:

picking up the image from the light reflected on a mirror through the camera lenses to be tested by the image pickup means;

measuring the signals outputted from each pixel in the image pickup means several times, calculating an average value of the outputted signals, and calculating a first, a second and a third variables according to the calculated average value as follows;

$$\text{First variable } (X_{i-1}) = \sum_{j=i-1-M}^{i-1+M} P_j$$

$$\text{Second variable } (X_i) = \sum_{j=i-M}^{i+M} P_j$$

$$\text{Third variable } X_{i+1} = \sum_{j=i+1-M}^{i+1+M} P_j$$

where:

$P_j$ represents a signal value indicating the intensity of light outputted from j pixel;

M represents a constant indicating a high point of each intensity signal;

calculating a high point of a light intensity signal according to the first, the second and the third variables which satisfy the following condition;

If $(X_i-1 < X_i, X_i > X_i+1)$, then High$(k) = Xi$ calculating a low point of the light intensity signal according to the first, the second and the third variables which satisfy the following condition;

If $(X_i-1 > X_i, X_i < X_i+1)$, then Low$(k) = Xi$ averaging the position of the high point and the low point according to following conditions after calculating the high point and the low point of the signal according to the above conditions;

$$\max = \sum_{k=1}^{N1} \text{High}(k)/N1$$

$$\min = \sum_{k=1}^{N2} \text{Low}(k)/N2$$

where:

$N_1$ represents a number of the high point of the signal; and $N_2$ represents a number of the low point of the signal calculating a set value for determining whether the focus is exactly made according to the calculated average value of the high point and the low point of the signal as follows; and $$MTF = \frac{\max - \min}{\max + \min}$$

where:

max represents a position average value of the high point of the light intensity signal; and min represents a position average value of the low point of the light intensity signal determining whether the focus of the lenses is exactly made according to the calculated set value.

16. The method for automatically inspecting the camera lenses of claim 15, wherein the step for determining whether the focus of the lenses is exactly made, includes the steps of:

changing the position of the mirror in multi-step, and measuring the set values at each mirror position several times; and determining that the mirror position obtained when the maximum value is measured as a state where the focus of the camera lenses is exactly made.

17. The method for automatically inspecting the camera lenses of claim 16, further comprising the steps of outputting the measured data through the output means or transmitting the measured data through the communication means.

* * * * *

UNITED STATES PATENT AND TRADEMARK OFFICE
CERTIFICATE OF CORRECTION

PATENT NO.: 5,726,746

DATED: March 10, 1998

INVENTOR(S): Heui-Jae PARK, Seok-Won LEE, Geon-Mo KANG, Ho-Gyun MOON

It is certified that an error appears in the above-identified patent and that said Letters Patent is hereby corrected as shown below:

Claim 1, Col. 7, line 60, "parallel" should be --beam of--;

line 62, "an" should be --the--;

Col. 8, line 3, --light intensity-- should be inserted after "digital";

line 5, --digital light intensity-- should be inserted after "the" (first occurrence);

line 6,, --electrical-- should be inserted after "the" (second occurrence);

line 9,, --digital light-- should be inserted after "the" (third occurrence);

line 10, "of the light" should be deleted; and line 11, "exactly made" should be --exact--.

Claim 2, Col. 8, line 17, --with respect to one another-- should be inserted after "intervals".

Claim 3, Col. 8, line 19, "of" (second occurrence) should be --between--; and line 23, "ps" should be --$P_s$--.

Claim 4, Col. 8, line 35, "variables" should be --variable--;

line 48, --digital light intensity-- should be inserted after "a" and "indicating the intensity of light" should be deleted;

line 50, --digital light-- should be inserted after "each";

UNITED STATES PATENT AND TRADEMARK OFFICE
CERTIFICATE OF CORRECTION

PATENT NO.: 5,726,746          Page 2 of 6

DATED:        March 10, 1998

INVENTOR(S):    Heui-Jae PARK, Seok-Won LEE, Geon-Mo KANG, Ho-Gyun MOON

It is certified that an error appears in the above-identified patent and that said Letters Patent is hereby corrected as shown below:

line 52, "a" (second occurrence) should be --the digital--;

line 57, "Xi" should be --$X_i$--;

line 59, --digital-- should be inserted after "the" (second occurrence);

line 64, "Xi" should be --$X_i$--;

line 67, --the-- should be inserted after "to";

Col. 9, line 1, --digital light intensity-- should be inserted after "the" (third occurrence);

line 11, --digital light intensity-- should be inserted after "the" (second occurrence);

line 12, --digital light intensity-- should be inserted after "the" (second occurrence);.

line 13, --wherein-- should be inserted after "and", and "a" should be --the--;

line 16, --digital light intensity-- should be inserted after "the";

line 23, --digital-- should be inserted after "the"; and line 25, --digital-- should be inserted after "the".

Claim 6, Col. 9, line 38, "as" should be --is--; and

UNITED STATES PATENT AND TRADEMARK OFFICE
CERTIFICATE OF CORRECTION

PATENT NO.: 5,726,746　　　　　　　　　　　　　　Page 3 of 6

DATED: March 10, 1998

INVENTOR(S): Heui-Jae PARK, Seok-Won LEE, Geon-Mo KANG, Ho-Gyun MOON

It is certified that an error appears in the above-identified patent and that said Letters Patent is hereby corrected as shown below:

line 39, "exactly made" should be --exact--.

Claim 7, Col. 9,　line 46, "as" should be --is--; and line 47, "exactly made" should be --exact--.

Claim 9, Col. 9,　line 55, "with" should be --having--.

Claim 13, Col. 10, line 13, --result-- should be inserted after "the".

Claim 14, Col. 10, line 27, "a" should be deleted;

line 29, --an-- should be inserted after "which";

line 37, --light intensity-- should be inserted after "digital";

line 39, --digital light intensity-- should be inserted after "the" (first occurrence)

line 40, --electrical-- should be inserted after "the" (second occurrence); and line 45, "exactly made" should be --exact--.

UNITED STATES PATENT AND TRADEMARK OFFICE
CERTIFICATE OF CORRECTION

PATENT NO.: 5,726,746

DATED: March 10, 1998

INVENTOR(S): Heui-Jae PARK, Seok-Won LEE, Geon-Mo KANG, Ho-Gyun MOON

It is certified that an error appears in the above-identified patent and that said Letters Patent is hereby corrected as shown below:

Claim 15, Col. 10, line 47 "the" should be deleted;

line 49, "the" (first occurrence) should be --an--; --,-- should be inserted after "image"; "the" (second occurrence) should be deleted;

line 50, --,-- should be inserted after "tested"; "the" (second occurrence) should be --an--;

line 55, "variables" should be --variable--;

Col. 11, line 1, --digital light intensity-- should be inserted after "a" and "indicating the intensity of light" should be deleted;

line 3, --digital light-- should be inserted after "each";

line 5, --digital-- should be inserted after "a" (second occurrence).

line 9, "Xi" should be --$X_i$--;

line 11, --digital-- should be inserted after "the";

line 15, "Xi" should be --$X_i$-- line 18, --digital light intensity-- should be inserted after "the" (second occurrence);

line 28, "$N_1$" should be --N1--;

UNITED STATES PATENT AND TRADEMARK OFFICE
CERTIFICATE OF CORRECTION

PATENT NO.: 5,726,746

DATED: March 10, 1998

INVENTOR(S): Heui-Jae PARK, Seok-Won LEE, Geon-Mo KANG, Ho-Gyun MOON

It is certified that an error appears in the above-identified patent and that said Letters Patent is hereby corrected as shown below:

line 29, "$N_2$" should be --N2--;

line 31, "exactly made" should be --exact--;

Col. 12, line 1, --digital light intensity-- should be inserted after "the" (third occurrence); "and" line 2 should be deleted.

line 10, --digital-- should be inserted after "the";

line 12, --digital-- should be inserted after "the"; --; and-- should be inserted after "signal"; and lines 13-14, "exact made" should be --exact--.

Claim 16, Col. 12, line 18, "exactly made" should be --exact--;

line 24, "as" should be --is--; and line 25, "exact made" should be --exact--.

UNITED STATES PATENT AND TRADEMARK OFFICE
CERTIFICATE OF CORRECTION

PATENT NO.: 5,726,746

DATED: March 10, 1998

INVENTOR(S): Heui-Jae PARK, Seok-Won LEE, Geon-Mo KANG, Ho-Gyun MOON

It is certified that an error appears in the above-identified patent and that said Letters Patent is hereby corrected as shown below:

Claim 17, line 28, "the" (second occurrence) should be --an--; an line 29, "the" (second occurrence) should be --a--.

Signed and Sealed this

Sixteenth Day of March, 1999

Attest:

Attesting Officer

Q. TODD DICKINSON

Acting Commissioner of Patents and Trademarks